United States Patent Office

3,525,947
Patented Aug. 25, 1970

3,525,947
MASER DEVICE WITH ENERGY LEVELS IN ACCORDANCE WITH MECHANICAL STRAIN
Günter Winstel, Munich, and Dietrich Bartels, Deisenhofen, near Munich, Germany, assignors to Siemens Aktiengesellschaft, Munich, Germany, a corporation of Germany
Filed Feb. 18, 1964, Ser. No. 345,658
Claims priority, application Germany, Feb. 21, 1963, S 83,828
Int. Cl. H01s *1/02, 3/18*
U.S. Cl. 330—4    8 Claims

ABSTRACT OF THE DISCLOSURE

The amplification characteristics of a maser amplifier for electromagnetic radiation are altered by the application of mechanical strain to the maser crystal.

---

Figure 1:
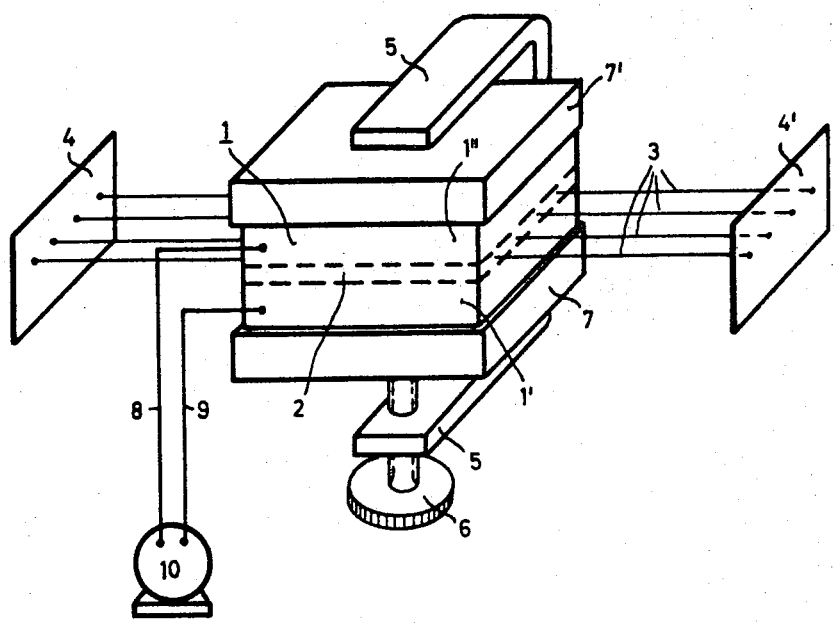

Our invention relates to electrical and optical devices for microwave amplification by stimulated emission of radiation, usually called "maser" or "laser," the latter term being applied to amplification and, in special cases, generation of radiation in or near the optical spectrum.

The physical phenomena results in the amplification and especially generation of short-wave radiation in the centimeter and millimeter wavelength spectra or in the region of optical radiation, as well as various active maser and laser materials and devices suitable for such purposes are generally known. Briefly, the amplification or generation of coherent radiation in a maser-active material is effected by induced emission stimulated by radiation of the same frequency irradiated into the active material or already contained therein. The energy required for amplifying the radiation results from a population inversion of the energy levels of the active material, from an inversion in the charge carrier, electron, hole population, for example. This inversion is effected by the energy supply from the outside, commonly known as pumping, for example by irradiating or optical light into the active material, or by injecting electric charge carriers (electrons or holes) into a p-n junction semiconductor. In many cases, particularly masers which amplify and in special cases generate optical radiation (lasers), the stimulating energy reverses the electron population inversion of the energy levels. The induced emission then corresponds to stimulated transitions of electrons from higher energy levels to lower energy levels such as the ground state.

We have discovered, according to the invention herein disclosed, that the radiation energy amplified and emitted from a maser by stimulated emission can be varied and controlled with respect to frequency and frequency-band width by subjecting the active maser material to different amounts of mechanical prestressing or pressure, the term "maser" being understood herein to include optical masers (lasers). In accordance with our invention, therefore, we provide the active material of a maser device with mechanical force-producing means which constrainedly engage the active material and impose thereupon an energy-level modifying mechanical strain or pressure, as well as adjusting means for controlling the mechanical strain to thereby alter the energy levels of the maser material.

Applicable as maser-active materials for the purpose of the invention are gaseous, liquid and solid substances.

It is known that when pressure is applied to gases or mixtures of gases, the line width in the absorption or emission spectrum of the gas increases with increasing pressure, compared for example with the conditions at about 100 torr. The increase in width is related to the facts that with increasing pressure the frequency of collisions between the gas particles increases, the lifetime of the excited states of the atoms or ions decreases, and the probability of mutual influence of the particles increases. The modification of the stimulated emission caused according to the invention by changing the pressure of maser-active gas, such as a helium-neon mixture, can be explained on the basis of the same phenomena.

In liquid maser materials, particularly those that contain other substances, for example in solution, the effect of pressure upon the frequency of emission or absorption lines and bands, corresponds partially to that occurring in gases and partially to that in solid bodies, the latter being dealt with presently.

When solid bodies are subjected to mechanical strain, the resulting internal stress causes a change in the energy-level constitution of the material depending upon the quantum-mechanical degeneration of a level, such stress causes either a mere change in energetic distance of this level or of an energy-band edge from another energy level, or from the conductive band or valence band, or causes the splitting of individual energy levels into a plurality of levels, or also in a conjoint occurrence of more than one such changes.

Variations in the constitution of the energy states in the material thus caused by subjecting the material to mechanical strain, manifest themselves experimentally by a frequency shift of the fluorescence or absorption lines and/or by widening of these lines in the spectrum of the particular material. The energy-level modifying stress can be imposed upon the material by subjecting it to pressure, pulling tension, bending, shearing or a combination of mechanical strains. In solid bodies of monocrystalline constitution, the forces applied for producing such modifying stresses may act in preferred directions of crystal orientation or are preferably applied in corresponding directions. The widening of a fluorescence or absorption line caused by mechanically straining the material can be carried out to such an extent that splitting of the line becomes noticeable, so that in lieu of the normal frequency-dependent intensity distribution of a fluorescence line, manifested by an approximately bell-shaped curve, a distorted distribution curve with two or more maximums and intermediate saddles is observed. This is indicative of splitting of at least one of the energy levels participating in the maser-active transition.

For example, when an arsenic-doped germanium crystal is subjected to mechanical strain, the degeneration of the energy levels of the impurity (arsenic) atoms is reduced or obviated with the result that the discrete energy levels of the arsenic atoms are split into two levels. The degeneration of the triplet level in the ground state of arsenic in germanium can likewise be eliminated by mechanical strain, so that triple splitting of this level takes place. Generally, the ground state of arsenic in germanium is naturally split into a singlet and a triplet level. (A singlet level is one in which the spins of all electrons are paired. A triplet is a level in which the spins of the two electrons are unpaired.)

The conditions with respect to the energy levels of phosphorus in phosphorus-doped germanium are similar to those in As-doped germanium. The particular shifting and/or splitting of the energy levels is also observed with the other known maser materials. The shifting and/or splitting of the levels in response to mechanical strain imposed upon the active material can in each case be determined by the known experimental expedients as applied for spectrographic determination of fluorescence and emission lines.

The frequency range of the stimulated emission from a maser, including optical masers, that is, the range within which the maser affords an amplification or generation of radiation, is likewise shifted or widened by the influence of internal stress caused, according to the invention, by the application of adjustable mechanical strain from the outside of the active maser material. This is generally analogous to the above-mentoned effects observed with fluorescence lines.

Figure 2:
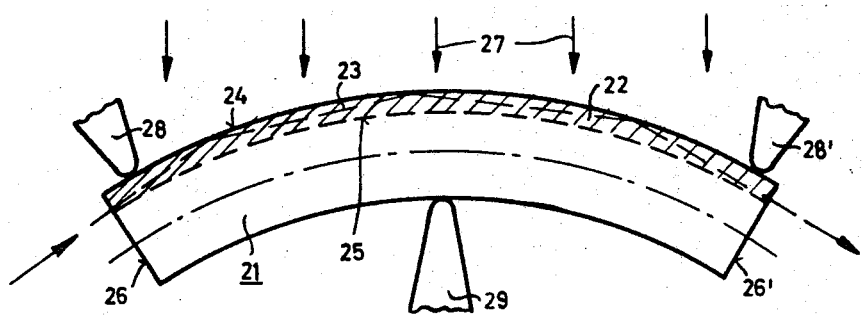

Aside from the application and variation of mechanical strain for producing internal stress in the active material, the design, operation and maser-active material need not differ from that of other devices of this kind. For example, the population inversion of the charge carriers on respective energy levels or bands for obtaining the radiative transitions that result in the stimulated emission, can be effected in the normal manner. Reference may be had, for example, to the series of articles entitled "Lasers: Devices and Systems," by S. Vogel and L. H. Dalberger, in Electronics of Oct. 27, Nov. 3, Nov. 10 and Nov. 21, 1961; also to the articles entitled "Injection Lasers: State of the Art," by M. I. Nathan and G. Burns, in Electronics of Dec. 6 and Dec. 13, 1963. In some cases, however, special designs of the maser devices are necessary or desirable, as is exemplified by preferred embodiments of the invention illustrated in the accompanying drawing in which:

FIG. 1 shows schematically a perspective view of a solid-state injection laser whose active material consists of a p-n junction semiconductor crystal subjected to adjustable pressure; and FIG. 2 shows schematically a lased whose active material is excited by optical pumping and subjected to adjustable bending.

The device according to FIG. 1 is provided with a semiconducting monocrystalline body 1 adequate for maser or laser effect. The crystal has donor-doped and acceptor-doped layers of n-type and p-type conductance denoted by 1' and 1" respectively, between which a p-n junction layer 2 is formed. An intrinsically conducting (i-type) layer may be located between the n-type and p-type layers; and it will be understood that the crystalline body may consist of one of the known or one of the laser-active solid materials mentioned elsewhere in this specification. Respective leads 8 and 9 connect the layers 1" and 1' with a suitable source of direct current schematically shown at 10. Due to the injection of charge carriers, there occurs an inversion of the charge-carrier population in the active narrow region near the p-n junction, where the electrons and holes assume a sufficiently high concentration to cause any photons to stimulate the emission of more photons. The resulting optical radiation is schematically represented at 3. It originates in the layer 2 and passes through the active material substantially in parallel relation to the layer plane. The two narrow end faces of the crystalline body 1 are polished so as to be optically planar and reflective. The two long sides perpendicular to the junction layer may be kept rough (non-reflective). The dimensions of the device are shown exaggerated for the purpose of illustration. Actually, the crystalline body 1 has a length in the order of 1 mm.

Shown at 4 and 4' are additional reflection surfaces which may be provided in known manner for employing the laser, for example in an optical radar system. In this respect, reference may be had, for example, to the above-mentioned literature. The reflection surfaces 4 and 4' are designed and arranged in dependence upon the frequency of the laser emission and the desired manner of directing the issuing emission toward the intended target. When a device of this kind is to be employed as a microwave amplifier, the additional reflection surfaces can be omitted.

The above-described body 1 of laser material is mounted between the legs of a clamping device 5 which is provided with a pressure screw 6 for exerting a controllable force against rigid pressure plates 7 and 7'. The plates are in face-to-face planar engagement with opposite sides of the body 1 and are preferably insulated therefrom. The resulting pressure distribution in the active layer 2 is substantially homogeneous. If desired, the clamping device may also be designed for producing an inhomogeneous pressure, for which purpose the pressure faces of the plates 7 and 7' are made non-planar, for example by giving them an outwardly bulging shape. The current-supply leads 8 and 9 are so connected with the respective layers 1' and 1" that the electric current has the polarity required for passing it through the crystalline body 1 in the forward-flow direciton of the p-n junction. The electrodes (not shown) to which the leads 8 and 9 are connected preferably have a sufficiently large area to secure an even distribution of the current flow over the entire area of the active layer 2.

When by means of the clamping device a homogeneous stress is adjusted in the layer 2, the energy levels in the entire layer are uniformly, i.e., by the same amount, displaced with respect to their position in the energy-level characteristic if no splitting of the energy levels takes place. In this manner, the laser, in the main, is detuned from its normal emission frequency so that the generated light changes its frequency accordingly. However, if the lasing energy level or levels are degenerate so that one or more become split, the mechanical stress results in an increase in band width. A band-width increase is also produced when an inhomogeneous pressure is exerted upon the material 1 and hence upon the active layer 2, even if the energy levels participating in the lasing transition do not split, i.e., are not degenerate. Thus, the energetic distance of the lasing energy levels is more or less changed relative to the stress-free condition of the material, corresponding to the higher or lower amount of mechanical strain extraneously applied to the material.

If a particularly large increase in band width, particularly a largely rectangular curve of laser amplification versus frequency is required, it is advisable to employ as laser-active material a substance that exhibits a pressure-responsive widening of the fluorescence line corresponding to the stimulated transition, i.e., the material in which one or more of the lasing energy levels become split under the influence of mechanical strain, and it is further advisable to produce an inhomogeneous stress in the active layer 2 of such a material. Materials that satisfy the just-mentioned conditions are, for example, the above-mentioned germanium crystals doped with arsenic or phosphorus. Under such conditions, the differently large widening of the laser transition to be stimulated is obtained, depending upon the magnitude of the local stress produced. The saddles in the curves of the frequency-dependent intensity distribution of the spectral line of laser transition, observed when the laser material is subjected to extremely strong mechanical strain, are compensated with respect to the laser as a whole by other portions of the radiation that exhibit an only slight or no saddling and are amplified or generated at localities where the material is simultaneously strained mechanically to a lesser extent.

The device shown in FIG. 2 affords performing the method of the invention by producing a desired inhomogeneous stress in a rod-shaped semiconducting maser material by subjecting it to bending strain. The semiconductor body 21 carries a transition layer 22 consisting of one or more p-n junctions between which an i-type layer may be located. These layers are epitaxially precipitated upon the semiconductor body 21 in the known manner, for example by depositing upon a germanium body an As-doped layer and thereafter a P-doped layer. The stimulated laser transitions take place in the junction layer 22. The resulting beam of emitted radiation extends on a path schematically indicated at 23. As shown, the beam is repeatedly reflected at the surface 24 of the laser material and also at the boundary face 25 between the base material 21 and the junction layer 22. To provide for substantially total reflection, the surface 24 is polished. For also obtaining a desired degree or substantially total reflection at the boundary face 25, the base material 21 can be so strongly doped, at least at the boundary face 25, that the radiation is metallically reflected. Depending upon whether the device is to be used as an amplifier or as a radiation generator, the end faces 26 and 26' are kept permeable to the laser beam or are made almost completely reflective, for example by silvering. If desired, external reflectors may be added for providing a repeated passage for the radiation through the layer 22.

The pumping of the lasers is effected in the known manner by radiating light or other electromagnetic radiation into the laser material, this being indicated by arrows 27 in FIG. 2. For this purpose, the surface 24 of the laser material must be permeable to the pumping light so that the pumping light can penetrate sufficiently into the layer 22. However, in a device of the type shown in FIG. 2, the excitation of the lasing energy levels can also be effected by charge-carrier injection into the p-n junction area in the manner described above with reference to FIG. 1.

According to FIG. 2, the semiconductor body 21 is clamped between two outer abutments 28 and 28' and a center abutment 29. The abutments 28 and 28' rest against the top surface of body 21. The center abutment presses against the bottom surface. The three abutments form part of a clamp similar to that shown in FIG. 1, the abutments 28 and 28' being rigidly connected with one leg of the clamping structure, and the abutment 29 being forcibly adjustable toward and away from the semiconductor body by means of a controllable screw bolt corresponding to the one denoted by 6 in FIG. 1. It will be recognized that in a device as shown in FIG. 2, the body of laser material is subjected to bending deformation with the result that the mechanical stress produced in the active layer 22 is inhomogeneous, being greatest in the middle of the body.

It has been found that the method of the invention affords obtaining, for example, the splitting of a fluorescence or absorption line up to $\Delta f/f = 5\%$, wherein $\Delta f$ denotes the distance between the two maxima of intensity distribution of the fluorescence line resulting from the effect of the mechanical stress, and $f$ denotes the frequency of the laser radiation. For a frequency of $f = 3 \cdot 10^{14}$ Hz., corresponding to a wave length of about $1\mu$, this results in a band width of the amplifier in the amount of about $15 \cdot 10^{12}$ Hz.

As mentioned, the body of active laser material may be provided with more than one p-n junction layer. When more than two layers of alternating conductance type, p-type and n-type, thus follow each other, so that two or more laser-active junction layers are present, the semiconductor body can be connected to the source of excitation current as follows. The layers having the same conductance type are to be conductively connected with each other. As a result, two poles are obtained which are connected to the respective positive and negative poles of the direct-voltage source of excitation current. When using alternating current, it suffices to connect the source only to the uppermost and lowermost layers so that the intermediate layers are in series therewith. In this case, those layers that any moment are poled in the inverse (blocking) direction, act as capacitive series impedances with respect to the junctions then poled in the forward direction.

Aside from the above-mentioned active germanium materials, the inveniton is applicable with any other laser-active materials, for example materials that require optical pumping or masers excitable by charge-carrier injection. Thus, a mixture of helium and neon is applicable for a gas laser in the manner known as such, by additionally providing the gas vessel with an adjustable pressure control device for subjecting the gas to different pressures during laser operation. An example of a suitable laser-active liquid is europium trisbenzoylacetonate, or europium boride ($EuB_3$) in an organic solvent, the liquid being contained in a quartz tube which, for the purpose of the invention, is provided with an adjustable pressure piston to subject the liquid to controlled pressure. Among the solid maser materials, aside from germanium, are ruby, uranium-doped $CaFe_2$, uranium-doped BaFe, GaAs, InP, InAs, and mixed crystals or alloys of Ga-In-P or Ga-In-As. Preferably employed as laser material are solid semiconductor substances in form of grown monocrystalline layers, so-called epitaxial structures, because they can be readily produced with two or more alternating p-type and n-type layers, if desired also with intermediate intrinsically conducting (i-type) layers. This applies, for example, to the abovementioned doped germanium materials, gallium arsenide and the other semiconductors of the III–V class.

Such semiconductor materials, particularly those to be excited by charge-carrier injection, are particularly well suited for the method according to the invention because they can be given a rather small thickness in a relatively simple manner. This is of advantage for subjecting them to bending strain as exemplified by the embodiment illustrated in FIG. 2. Preferably employed for the purpose of the invention are laser-active materials or combinations of materials that are excitable by carrier injection, since this, generally, permits attaining a particularly high specific energy density as desired for stimulated emission. As a result, such laser-active semiconductor bodies, compared for example with a ruby laser rod, can be given smaller length and smaller cross-sectional area for a given radiative energy output. This affords various advantages with respect to the design of the mechanical forcing or clamping devices employèd for subjecting the active body of material to the energy-level modying strain. For example, it is simpler to produce a homogeneous mechanical strain over the smaller area than over a large area.

We claim:

1. A maser amplifier for the amplification by stimulated emission of radiation, said maser amplifier having an enlarged bandwidth, said maser amplifier comprising:
   a material having a maser-active layer;
   pumping means connected to said material in operative proximity with said layer for permitting population inversion; and
   pressure means abutting said material for applying substantially inhomogeneous material stress to said material to produce an inhomogeneous internal strain in the layer thereof thereby altering inhomogeneously the maser-active energy levels of said layer and varying the amplification characteristics of said maser amplifier in accordance with the inhomogeneous altering of said energy levels.

2. A maser amplifier for the amplification by stimulated emission of radiation, said maser amplifier having an enlarged bandwidth, said maser amplifier comprising:
   a material having a maser-active layer;
   pumping means connected to said material in operative proximity with said layer for permitting population inversion; and
   pressure means abutting said material for applying mechanical stress to said material to produce an internal strain in the layer thereof thereby altering the energy levels of said junction layer and varying the amplification characteristics of said maser amplifier in accordance with the altering of said energy levels, said material having energy levels acting as one of the upper and lower levels of said stimulated emission, and at least said upper or said lower energy levels being degenerate in the unstrained condition of said material and being split into several separate levels in strained condition thereby enlarging the bandwidth of the unstrained material.

3. A maser amplifier as claimed in claim 1, wherein said material is a semiconductor crystal having a region of n-conductivty type and a region of p-conductivity type forming a maser-active pn junction layer therebetween.

4. A maser amplifier as claimed in claim 1, wherein said pressure means comprises abutting members, said abutting members having configurations for producing a substantially non-homogeneous strain in said layer.

5. A maser amplifier as claimed in claim 2, wherein said material is a semiconductor crystal having a region of n-conductivity type and a region of p-conductivity type forming a maser-active pn junction layer therebetween.

6. A maser amplifier as claimed in claim 2, wherein said pressure means comprises abutting members, said abutting members having configurations for producing a substantially non-homogeneous strain in said layer.

7. A maser amplifier as claimed in claim 3, wherein said semiconductor crystal comprises monocrystalline epitaxially deposited layers.

8. A maser amplifier as claimed in claim 5, wherein said semiconductor crystal comprises monocrystalline epitaxially deposited layers.

References Cited

UNITED STATES PATENTS

| 3,145,354 | 8/1964 | Hutson. | |
| 3,183,359 | 5/1965 | White. | |
| 3,245,002 | 4/1966 | Hall | 331—94.5 |
| 3,387,230 | 6/1968 | Marinace | 332—7.51 |

OTHER REFERENCES

Fenner et al.: "Coherent Light Emission From GaAs Junctions," Physical Review Letters, Nov. 1, 1962, vol. 9, No. 9, pp. 366–368.

Stevenson et al.: "Line Widths and Pressure Shifts in Mode Structure of Stimulated Emission from GaAs Junctions," IBM Journal, April 1963, pp. 155–156.

ALFRED L. BRODY, Primary Examiner

U.S. Cl. X.R.

250—199; 307—312; 330—43; 331—94.5; 332—7.51